United States Patent [19]
Fletcher et al.

[11] Patent Number: 6,099,131
[45] Date of Patent: Aug. 8, 2000

[54] ELECTRO-OPTIC REARVIEW MIRROR SYSTEM

[75] Inventors: Sean J. Fletcher; Patrick J. Lawlor, both of Dublin, Ireland; Kenneth Schofield, Holland, Mich.

[73] Assignee: Donnelly Corporation, Holland, Mich.

[21] Appl. No.: 09/155,040

[22] PCT Filed: Mar. 19, 1997

[86] PCT No.: PCT/IE97/00019

§ 371 Date: Apr. 22, 1999

§ 102(e) Date: Apr. 22, 1999

[87] PCT Pub. No.: WO97/34780

PCT Pub. Date: Sep. 25, 1997

[30] Foreign Application Priority Data

Mar. 19, 1996 [IE] Ireland .................................. S960227

[51] Int. Cl.⁷ ................................................ G02B 27/00
[52] U.S. Cl. ...................... 359/604; 359/601; 359/603; 359/605
[58] Field of Search ..................... 359/604, 601, 359/603, 605, 265, 871, 872

[56] References Cited

U.S. PATENT DOCUMENTS

| | | | |
|---|---|---|---|
| 5,659,423 | 8/1997 | Schierbeek et al. | 359/604 |
| 5,669,698 | 9/1997 | Veldman et al. | 362/83.1 |
| 5,812,321 | 9/1998 | Schierbeek et al. | 359/601 |
| 5,883,605 | 3/1999 | Knapp | 345/7 |
| 5,938,321 | 8/1999 | Bos et al. | 362/494 |
| 5,971,552 | 10/1999 | O'Farrell et al. | 359/871 |

*Primary Examiner*—Cassandra Spyrou
*Assistant Examiner*—Mohammad Y. Sikder
*Attorney, Agent, or Firm*—Van Dyke, Garner, Linn & Burkhart, LLP

[57] ABSTRACT

An electro-optic rearview mirror system for a vehicle includes an interior mirror housing (10) containing an interior electro-optic mirror unit (18). At least one light sensor, and preferably a pair of light sensors (24, 26), is provided for sensing the ambient light level outside the vehicle. Control circuitry, which may be mounted on a PCB (36), is responsive to an output (34) from the at least one light sensor (24, 26) to establish a drive voltage for the electro-optic mirror unit (18). The PCB 36 is located outside the mirror housing (10) and mounted at the interior ceiling of the vehicle overhead and centrally between the driver and the front passenger, such as in a header (16) on the interior ceiling of the vehicle,

105 Claims, 3 Drawing Sheets

FIG. 3

ELECTRO-OPTIC REARVIEW MIRROR SYSTEM

BACKGROUND OF THE INVENTION

This invention relates to an electro-optic rearview mirror system for a vehicle.

Electro-optic rearview mirrors are very well known in the art and include a mirror housing containing a variable reflectance electro-optic mirror unit. While many different constructions of variable reflectance electro-optic mirror units are known, a typical construction uses two substantially parallel glass plates, one of which (herein referred to as the rear plate) is coated on one surface with a reflective layer (the other plate is referred to as the front plate). The front and rear plates are separated by a space which contains an electro-optic medium allowing variation in the amount of light transmitted through the medium by varying the strength of an electric field applied across the medium. For example, in liquid crystal rearview mirrors the space between the front and rear plates is filled with a semi-viscous liquid crystal material. In electrochemichromic or electrochromic mirrors, the space contains a liquid, thickened liquid, gel or semi-solid material.

The mirror unit is mounted in the mirror housing with the front plate facing the viewer, so that light incident externally or the mirror unit returns to the viewer, after reflection at the rear plate, only after a double crossing of the electro-optic medium. Electrode means, for example a respective transparent electrode layer on each plate, permit varying the electrical field across the electro-optic medium, thereby to correspondingly vary the level of reflected light returned to the viewer and accordingly the reflectivity of the mirror unit as a whole.

In the simplest case the reflectivity of the mirror unit is switchable manually between a maximum appropriate for daylight use to a minimum appropriate for nighttime use where it is required to reduce the glare from headlights of following vehicles. However, it is also known to mount one or more light sensors in the mirror housing which sense the light levels forwardly and/or rearwardly of the vehicle and automatically adjust the reflectivity of the mirror unit according to selected criteria. Typical arrangements of the latter kind are described in U.S. Pat. Nos. 4,793,690, 4,799, 768, 4,886,960, 5,193,029, 5,140,455 and 5,151,816.

Hitherto, in all cases the control circuitry for the electro-optic mirror unit has been contained, usually on a printed circuit board (PCB), within the mirror housing itself.

However, this has substantial disadvantages. The mirror housing needs to be fairly bulky to accommodate the control circuitry, which is undesirable from an aesthetic point of view, and this is exacerbated by the current trend to located more and more function in the mirror housing such as a compass display, navigational display system and infra-red (IR) sensor for automatic locking system. Also, the control circuitry tends to generate substantial heat, often as high as 2–3 watts, which means the mirror housing has to be designed for adequate ventilation. Further, the mirror is complex to assemble and has a high replacement cost.

SUMMARY OF THE INVENTION

It is an object of the present invention to mitigate these disadvantages.

Accordingly, the invention provides an electro-optic rearview mirror system for a vehicle, comprising a mirror housing containing an electro-optic mirror unit, at least one light sensor for sensor. the ambient light level outside the vehicle, and control circuitry responsive to signal(s) from the light sensor(s) to establish a drive voltage for the electro-optic mirror unit, wherein the control circuitry is located outside the mirror housing.

Preferably, the mirror housing is mounted interior is of the vehicle.

The light sensor(s) may also he located in the mirror housing, but they may alternatively be located elsewhere in the vehicle where an adequate view of the ambient light level exterior of the-vehicle can be obtained.

The control circuitry is preferably located in a header, which is a shallow housing mounted on the ceiling of the vehicle, preferably located behind the rearview mirror housing overhead and centrally between the driver and the front passenger seats.

An advantage of the invention is that the mirror housing does not require interior space to be allocated to the control circuitry and therefore the mirror housing can be reduced in size or, if desired, can accommodate extra functions, such as a compass display, navigational display system or irfra-red (IR) sensor as referred to above, without unduly increasing the size of the housing.

Further, the heat generated in the mirror housing is reduced, and also the constructional complexity and replacement cost is reduced. Also, the reduction in components in the mirror, and the use of a black seal on the perimeter of the electro-optic element, permits a simpler assembly method to be used.

Preferably the control circuitry shares a processor which is used for other control functions of the vehicle. This has further advantages.

First, it allows additional functions contained in the mirror housing to be connected to a vehicle bus system without the cost and complexity of adding a separate bus connection node in the mirror. Also, switches and indicators presently located in the mirror housing can be grouped in a central location with other controls. Further, there is the ability to have the electro-optic mirror sensitivity adjusted to customer preferences at dealer service intervals. Additionally, sensors and other features located in the mirror housing can be used for multiple functions, for example, the light sensors used for the electro-optic mirror unit can be used for automatic headlight control.

Embodiments of the invention will now be described, by way of example, with reference to the accompanying drawings, in which:

DESCRIPTION OF THE PREFERRED EMBODIMENT

Referring to the drawings, a vehicle rearview mirror system includes an interior mirror housing 10 mounted in conventional manner via a ball and socket joint 12 to the lower end of a mirror support bracket 14. The upper end of the support bracket 14 is secured to the forward end of a shallow housing (header) 16 mounted on the ceiling of the vehicle behind the mirror housing 10 overhead and centrally between the driver and the front passenger seats. Alternatively the upper end of the bracket 14 can be secured directly to the interior surface of the vehicle windscreen.

Figure 2:
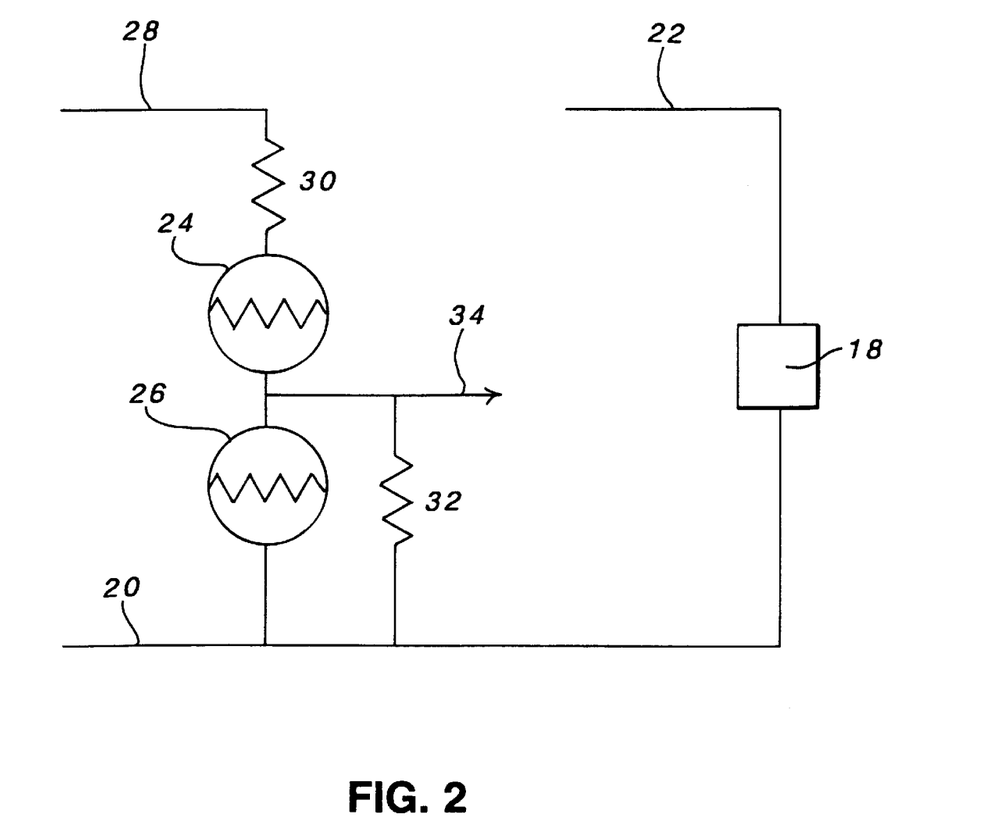
FIG. 2 is a circuit diagram so the components inside the mirror housing in the mirror system of FIG. 1.

The mirror housing 10 contains an electro-optic mirror unit 18 having a ground lead 20 and a voltage supply lead 22. The mirror housing 10 also contains a pair of light sensors 24 and 26 mounted on a PCE 27 and respectively positioned to sense the ambient light levels forwardly and rearwardly of the vehicle through appropriate apertures in the mirror housing in known manner. The light sensors are connected in series between a sensor voltage supply lead 28 and the ground lead 20. A resistor 30 in series with the sensor 24 and a resistor 32 in parallel with the sensor 26 establish appropriate biassing of the sensors 24 and 26 in known manner. A sensor outnut lead 34 provides a voltage signal which is a function of the ambient light levels forwardly and rearwardly of the vehicle. It will be understood that the particular sensor circuit shown in FIG. 2 is just one a number which could be used, of varying sophistication and complexity, providing one or more sensor outputs as is known in the art.

The support bracket 14 is hollow. The four leads 20, 22, 28 and 34 enter the lower end of the hollow bracket 14, travel up and emerge from the top end of the bracket 14, and are connected to a PCB 36 mounted in the header 16. A connector 38 at the top end of the bracket 14 permits ready removal and replacement of the mirror housing and bracket without needing to disconnect and reconnect the leads at the PCB 36.

Micro-processor-based signal processing and communications circuitry 40, powered by a regulated power supply 42 derived from the vehicle battery, is mounted on the PCB 36. The circuitry 40 is a master controller for many vehicle functions, from which it sends and receives signals via input and output lines 44. To the extent these functions are unrelated to mirror control, they are of no concern to the present invention.

A part 46 of the controller 40 constitutes the control circuitry for the mirror unit 18 (it will be understood that although the mirror control circuitry 46 is shown as a discrete portion of the controller 40, much of it will be shared with other control functions). The mirror control circuitry 46 includes logic circuitry to process the sensor output signal on the lead 34 to determine the appropriate level of mirror reflectivity, and drive circuitry which establishes the resultant drive voltage to be applies via the lead 22 across the electro-optic medium in the mirror unit 18 to set the reflectivity accordingly. Such functions are well understood in the art.

Figure 1:
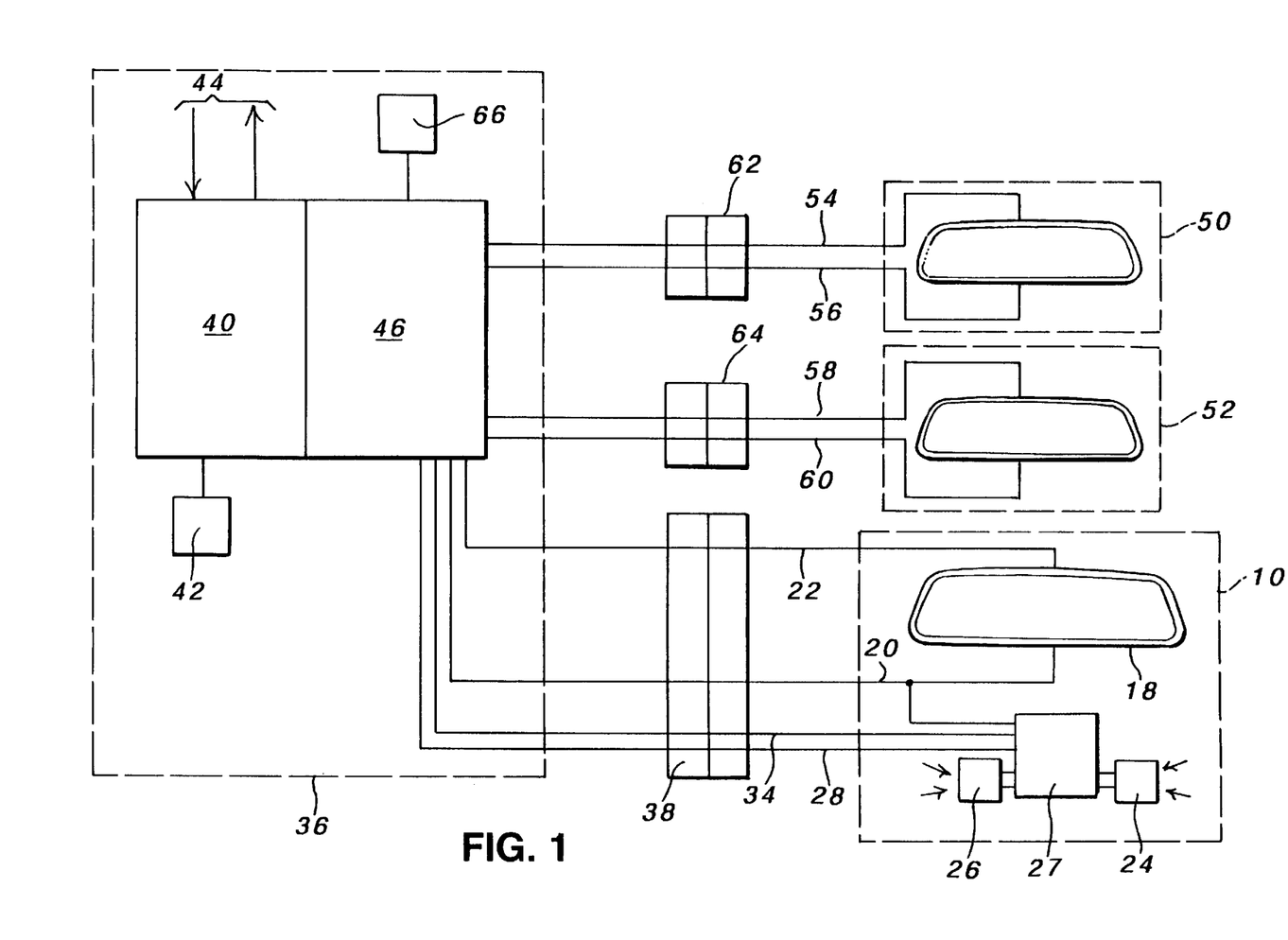
FIG. 1 is a block diagram of an electro-optic rearview mirror system for a vehicle according to an embodiment of the invention.
Figure 3:
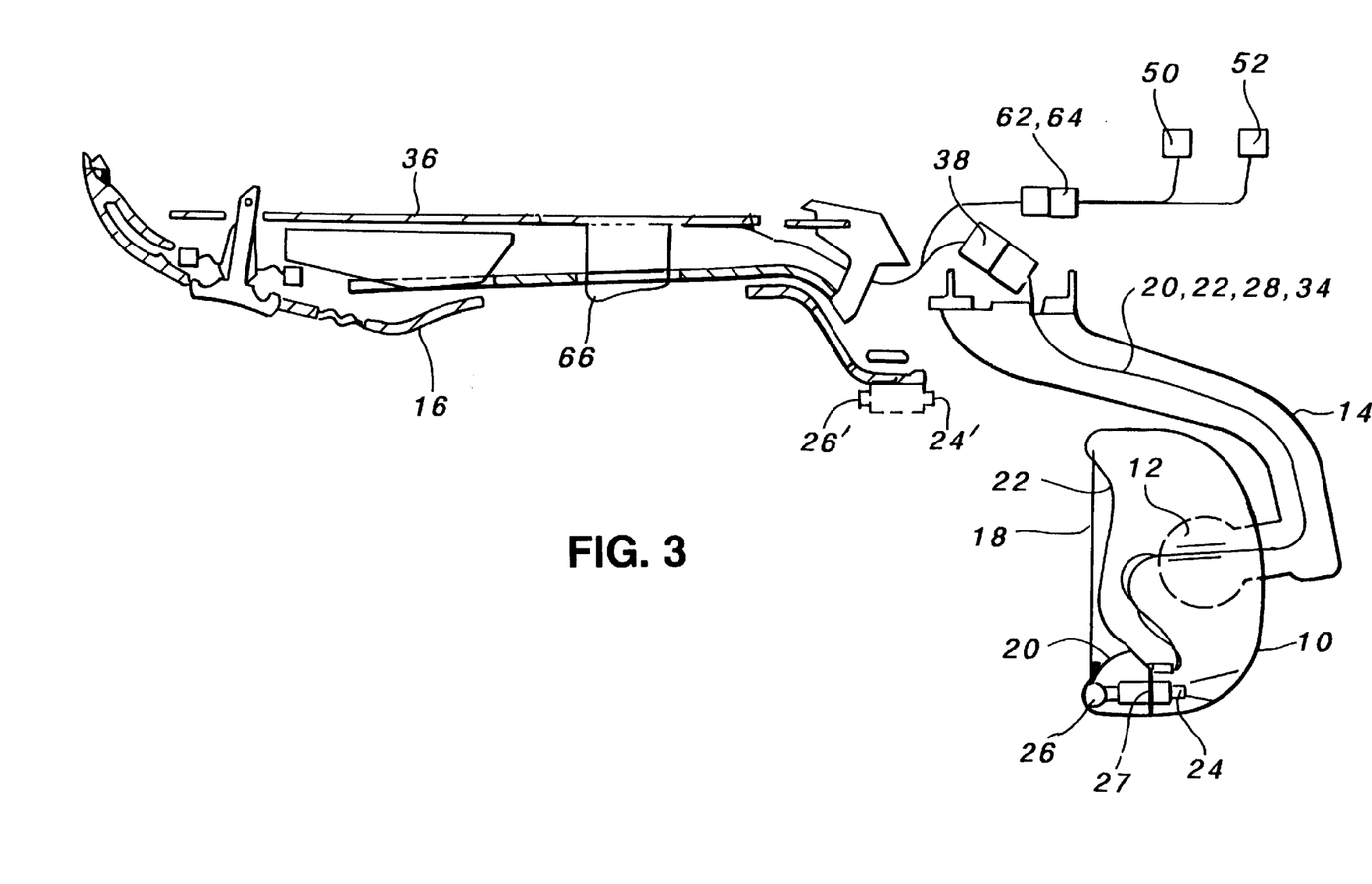
FIG. 3 is a cross-sectional view of one example of the physical layout inside a vehicle of the mirror system of FIG. 1.

In the embodiment shown in FIGS. 1 to 3, the mirror control circuitry 46 also controls the reflectivity of a pair of exterior electro-optic mirror assemblies 50 and 52 via pairs of leads 54, 56 and 58, 60 respectively. These mirror assemblies 50 and 52 also have electro-optic mirror units, similar to the element 18, and the voltages on the leads 54 to 60 control the reflectivity thereof in response to the sensor output signal on the lead 34. The leads 54 to 60 are connected from the PC3 36 to the mirror assemblies 50, 52 via connectors 62, 64 to permit ready removal and replacement of the mirror assemblies 50, 52 without needing to disconnect and reconnect the leads at the PCB 36.

The PCB 36 also mounts a mirror control switch 66, accessible from below the header 16, to permit the driver to manually disable the control circuitry 46 if desired, for example when the vehicle is reversing at night and the driver does not wish the reflectivity of the mirror to be reduced. The mirror control switch 60 may alternatively be located at, the mirror housing 10. Alternatively, the operation of the control circuitry 46 may be automatically overridden by the controller 40 when the latter determines that the vehicle is in reverse gear, as indicated by a sensor input at 44.

In an alternative embodiment of the invention the sensors 24 and 26 are not located in the mirror housing 10, but are fitted to the forward end of the header 16 at a position where an adequate view of the ambient light levels forwardly and rearwardly of the vehicle can be obtained. This alternate location is indicated in dashed lines at 24', 26' in FIG. 3. This further reduces the complexity of the mirror assembly. The other details of this embodiment are the same as previously described.

The invention is not limited to the embodiment of described and exemplified, which can be amended or modified without departing from the scope of the invention.

What is claimed is:

1. An electro-optic interior rearview mirror system for a vehicle, comprising:
an interior mirror housing containing an interior electro-optic mirror unit, at least one light sensor at said interior mirror housing for sensing the ambient light level outside the vehicle, and control circuitry responsive to an output from said at least one light sensor to establish a drive voltage for the electro-optic mirror unit, said control circuitry being located outside said interior mirror housing and mounted at the interior ceiling of the vehicle overhead and centrally between the driver and the front passenger seats, wherein said control circuitry is positioned at a location with other control functions of the vehicle.

2. A rearview mirror system as claimed in claim 1, wherein said interior mirror housing is mounted to a header in the interior of the vehicle.

3. A rearview mirror system as claimed in claim 1, wherein said mirror housing is supported by a hollow bracket and said control circuitry is connected to said interior electro-optic mirror unit by leads extending within said hollow bracket.

4. A rearview mirror system as claimed in claim 1, wherein said control circuitry is located in a housing mounted on the interior ceiling of the vehicle.

5. A rearview mirror system as claimed in claim 4, wherein said control circuit housing is located behind said interior mirror housing overhead and centrally between the driver and the front passenger seats.

6. A rearview mirror system as claimed in claim 1, wherein said at least one light sensor is located in said interior mirror housing.

7. A rearview mirror system as claimed in claim 4, wherein a light sensor is located in said control circuit housing.

8. A rearview mirror system as claimed in claim 1, wherein said control circuitry shares a processor which is used for other control functions of the vehicle.

9. A rearview mirror system as claimed in claim 8, also including at least one further mirror housing mounted on the exterior of the vehicle and containing a further electrooptic mirror unit, said control circuitry further being responsive to the output from said at least one light sensor to establish a drive voltage for said further electro-optic mirror unit.

10. A rearview mirror system as claimed in claim 2, wherein said interior mirror housing is supported by a hollow bracket and said control circuitry is connected to said electro-optic mirror unit by leads extending within said hollow bracket.

11. A rearview mirror system as claimed in claim 2, wherein said control circuitry is located in a housing mounted on the interior ceiling of the vehicle.

12. A rearview mirror system as claimed in claim 3, wherein said control circuitry is located in a housing mounted on the interior ceiling of the vehicle.

13. A rearview mirror system as claimed in claim 10, wherein said control circuitry is located in a housing mounted on the interior ceiling of the vehicle.

14. A rearview mirror system as claimed in claim 11, wherein said control circuit housing is located behind said interior mirror housing overhead and centrally between the driver and the front passenger seats.

15. A rearview mirror system as claimed in claim 12, wherein said control circuit housing is located behind said interior mirror housing overhead and centrally between the driver and the front passenger seats.

16. A rearview mirror system as claimed in claim 13, wherein said control circuit housing is located behind said interior mirror housing overhead and centrally between the driver and the front passenger seats.

17. A rearview mirror system as claimed in claim 2, wherein said at least one light sensor is located in said interior mirror housing.

18. A rearview mirror system as claimed in claim 3, wherein said at least one light sensor is located in said interior mirror housing.

19. A rearview mirror system as claimed in claim 4, wherein the said at least one light sensor is located in said interior mirror housing.

20. A rearview mirror system as claimed in claim 5, wherein the said at least one light sensor is located in said interior mirror housing.

21. A rearview mirror system as claimed in claim 10, wherein the said at least one light sensor is located in said interior mirror housing.

22. A rearview mirror system as claimed in claim 11, wherein the said at least one light sensor is located in said interior mirror housing.

23. A rearview mirror system as claimed in claim 12, wherein the said at least one light sensor is located in said interior mirror housing.

24. A rearview mirror system as claimed in claim 13, wherein the said at least one light sensor is located in said interior mirror housing.

25. A rearview mirror system as claimed in claim 14, wherein the said at least one light sensor is located in said interior mirror housing.

26. A rearview mirror system as claimed in claim 15, wherein the said at least one light sensor is located in said interior mirror housing.

27. A rearview mirror system as claimed in claim 16, wherein the said at least one light sensor is located in said interior mirror housing.

28. A rearview mirror system as claimed in claim 5, wherein a light sensor is located in said control circuit housing.

29. A rearview mirror system as claimed in claim 11, wherein a light sensor is located in said control circuit housing.

30. A rearview mirror system as claimed in claim 12, wherein a light sensor is located in said control circuit housing.

31. A rearview mirror system as claimed in claim 13, wherein a light sensor is located in said control circuit housing.

32. A rearview mirror system as claimed in claim 14, wherein a light sensor is located in said control circuit housing.

33. A rearview mirror system as claimed in claim 15, wherein a light sensor is located in said control circuit housing.

34. A rearview mirror system as claimed in claim 16, wherein a light sensor is located in said control circuit housing.

35. A rearview mirror system as claimed in claim 2, wherein said control circuitry shares a processor which is used for other control functions of the vehicle.

36. A rearview mirror system as claimed in claim 3, wherein said control circuitry shares a processor which is used for other control functions of the vehicle.

37. A rearview mirror system as claimed in claim 4, wherein said control circuitry shares a processor which is used for other control functions of the vehicle.

38. A rearview mirror system as claimed in claim 5, wherein said control circuitry shares a processor which is used for other control functions of the vehicle.

39. A rearview mirror system as claimed in claim 6, wherein said control circuitry shares a processor which is used for other control functions of the vehicle.

40. A rearview mirror system as claimed in claim 7, wherein said control circuitry shares a processor which is used for other control functions of the vehicle.

41. A rearview mirror system as claimed in claim 10, wherein said control circuitry shares a processor which is used for other control functions of the vehicle.

42. A rearview mirror system as claimed in claim 11, wherein said control circuitry shares a processor which is used for other control functions of the vehicle.

43. A rearview mirror system as claimed in claim 12, wherein said control circuitry shares a processor which is used for other control functions of the vehicle.

44. A rearview mirror system as claimed in claim 13, wherein said control circuitry shares a processor which is used for other control functions of the vehicle.

45. A rearview mirror system as claimed in claim 15, wherein said control circuitry shares a processor which is used for other control functions of the vehicle.

46. A rearview mirror system as claimed in claim 16, wherein said control circuitry shares a processor which is used for other control functions of the vehicle.

47. A rearview mirror system as claimed in claim 17, wherein said control circuitry shares a processor which is used for other control functions of the vehicle.

48. A rearview mirror system as claimed in claim 18, wherein said control circuitry shares a processor which is used for other control functions of the vehicle.

49. A rearview mirror system as claimed in claim 19, wherein said control circuitry shares a processor which is used for other control functions of the vehicle.

50. A rearview mirror system as claimed in claim 20, wherein said control circuitry shares a processor which is used for other control functions of the vehicle.

51. A rearview mirror system as claimed in claim 21, wherein said control circuitry shares a processor which is used for other control functions of the vehicle.

52. A rearview mirror system as claimed in claim 22, wherein said control circuitry shares a processor which is used for other control functions of the vehicle.

53. A rearview mirror system as claimed in claim 23, wherein said control circuitry shares a processor which is used for other control functions of the vehicle.

54. A rearview mirror system as claimed in claim 24, wherein said control circuitry shares a processor which is used for other control functions of the vehicle.

55. A rearview mirror system as claimed in claim 25, wherein said control circuitry shares a processor which is used for other control functions of the vehicle.

56. A rearview mirror system as claimed in claim 26, wherein said control circuitry shares a processor which is used for other control functions of the vehicle.

57. A rearview mirror system as claimed in claim 27, wherein said control circuitry shares a processor which is used for other control functions of the vehicle.

58. A rearview mirror system as claimed in claim 28, wherein said control circuitry shares a processor which is used for other control functions of the vehicle.

59. A rearview mirror system as claimed in claim 29, wherein said control circuitry shares a processor which is used for other control functions of the vehicle.

60. A rearview mirror system as claimed in claim 30, wherein said control circuitry shares a processor which is used for other control functions of the vehicle.

61. A rearview mirror system as claimed in claim 31, wherein said control circuitry shares a processor which is used for other control functions of the vehicle.

62. A rearview mirror system as claimed in claim 32, wherein said control circuitry shares a processor which is used for other control functions of the vehicle.

63. A rearview mirror system as claimed in claim 33, wherein said control circuitry shares a processor which is used for other control functions of the vehicle.

64. A rearview mirror system as claimed in claim 34, wherein said control circuitry shares a processor which is used for other control functions of the vehicle.

65. A rearview mirror system as claimed in claim 35, also including at least one further mirror housing mounted on the exterior of the vehicle and containing a further electro-optic mirror unit, said control circuitry further being responsive to the output from said at least one light sensor to establish a drive voltage for said further electro-optic mirror unit.

66. A rearview mirror system as claimed in claim 36, also including at least one further mirror housing mounted on the exterior of the vehicle and containing a further electro-optic mirror unit, said control circuitry further being responsive to the output from said at least one light sensor to establish a drive voltage for said further electro-optic mirror unit.

67. A rearview mirror system as claimed in claim 37, also including at least one further mirror housing mounted on the exterior of the vehicle and containing a further electro-optic mirror unit, said control circuitry further being responsive to the output from said at least one light sensor to establish a drive voltage for said further electro-optic mirror unit.

68. A rearview mirror system as claimed in claim 38, also including at least one further mirror housing mounted on the exterior of the vehicle and containing a further electro-optic mirror unit, said control circuitry further being responsive to the output from said at least one light sensor to establish a drive voltage for said further electro-optic mirror unit.

69. A rearview mirror system as claimed in claim 39, also including at least one further mirror housing mounted on the exterior of the vehicle and containing a further electro-optic mirror unit, said control circuitry further being responsive to the output from said at least one light sensor to establish a drive voltage for said further electro-optic mirror unit.

70. A rearview mirror system as claimed in claim 40, also including at least one further mirror housing mounted on the exterior of the vehicle and containing a further electro-optic mirror unit, said control circuitry further being responsive to the output from said at least one light sensor to establish a drive voltage for said further electro-optic mirror unit.

71. A rearview mirror system as claimed in claim 41, also including at least one further mirror housing mounted on the exterior of the vehicle and containing a further electro-optic mirror unit, said control circuitry further being responsive to the output from said at least one light sensor to establish a drive voltage for said further electro-optic mirror unit.

72. A rearview mirror system as claimed in claim 42, also including at least one further mirror housing mounted on the exterior of the vehicle and containing a further electro-optic mirror unit, said control circuitry further being responsive to the output from said at least one light sensor to establish a drive voltage for said further electro-optic mirror unit.

73. A rearview mirror system as claimed in claim 43, also including at least one further mirror housing mounted on the exterior of the vehicle and containing a further electro-optic mirror unit, said control circuitry further being responsive to the output from said at least one light sensor to establish a drive voltage for said further electro-optic mirror unit.

74. A rearview mirror system as claimed in claim 44, also including at least one further mirror housing mounted on the exterior of the vehicle and containing a further electro-optic mirror unit, said control circuitry further being responsive to the output from said at least one light sensor to establish a drive voltage for said further electro-optic mirror unit.

75. A rearview mirror system as claimed in claim 45, also including at least one further mirror housing mounted on the exterior of the vehicle and containing a further electro-optic mirror unit, said control circuitry further being responsive to the output from said at least one light sensor to establish a drive voltage for said further electro-optic mirror unit.

76. A rearview mirror system as claimed in claim 46, also including at least one further mirror housing mounted on the exterior of the vehicle and containing a further electro-optic mirror unit, said control circuitry further being responsive to the output from said at least one light sensor to establish a drive voltage for said further electro-optic mirror unit.

77. A rearview mirror system as claimed in claim 47, also including at least one further mirror housing mounted on the exterior of the vehicle and containing a further electro-optic mirror unit, said control circuitry further being responsive to the output from said at least one light sensor to establish a drive voltage for said further electro-optic mirror unit.

78. A rearview mirror system as claimed in claim 48, also including at least one further mirror housing mounted on the exterior of the vehicle and containing a further electro-optic mirror unit, said control circuitry further being responsive to the output from said at least one light sensor to establish a drive voltage for said further electro-optic mirror unit.

79. A rearview mirror system as claimed in claim 49, also including at least one further mirror housing mounted on the exterior of the vehicle and containing a further electro-optic mirror unit, said control circuitry further being responsive to the output from said at least one light sensor to establish a drive voltage for said further electro-optic mirror unit.

80. A rearview mirror system as claimed in claim 50, also including at least one further mirror housing mounted on the exterior of the vehicle and containing a further electro-optic mirror unit, said control circuitry further being responsive to the output from said at least one light sensor to establish a drive voltage for said further electro-optic mirror unit.

81. A rearview mirror system as claimed in claim 51, also including at least one further mirror housing mounted on the exterior of the vehicle and containing a further electro-optic mirror unit, said control circuitry further being responsive to the output from said at least one light sensor to establish a drive voltage for said further electro-optic mirror unit.

82. A rearview mirror system as claimed in claim 52, also including at least one further mirror housing mounted on the exterior of the vehicle and containing a further electro-optic mirror unit, said control circuitry further being responsive to the output from said at least one light sensor to establish a drive voltage for said further electro-optic mirror unit.

83. A rearview mirror system as claimed in claim 53, also including at least one further mirror housing mounted on the exterior of the vehicle and containing a further electro-optic mirror unit, said control circuitry further being responsive to the output from said at least one light sensor to establish a drive voltage for said further electro-optic mirror unit.

84. A rearview mirror system as claimed in claim 54, also including at least one further mirror housing mounted on the exterior of the vehicle and containing a further electro-optic mirror unit, said control circuitry further being responsive to the output from said at least one light sensor to establish a drive voltage for said further electro-optic mirror unit.

85. A rearview mirror system as claimed in claim 55, also including at least one further mirror housing mounted on the exterior of the vehicle and containing a further electro-optic mirror unit, said control circuitry further being responsive to the output from said at least one light sensor to establish a drive voltage for said further electro-optic mirror unit.

86. A rearview mirror system as claimed in claim 56, also including at least one further mirror housing mounted on the exterior of the vehicle and containing a further electro-optic mirror unit, said control circuitry further being responsive to the output from said at least one light sensor to establish a drive voltage for said further electro-optic mirror unit.

87. A rearview mirror system as claimed in claim 57, also including at least one further mirror housing mounted on the exterior of the vehicle and containing a further electro-optic mirror unit, said control circuitry further being responsive to the output from said at least one light sensor to establish a drive voltage for said further electro-optic mirror unit.

88. A rearview mirror system as claimed in claim 58, also including at least one further mirror housing mounted on the exterior of the vehicle and containing a further electro-optic mirror unit, said control circuitry further being responsive to the output from said at least one light sensor to establish a drive voltage for said further electro-optic mirror unit.

89. A rearview mirror system as claimed in claim 59, also including at least one further mirror housing mounted on the exterior of the vehicle and containing a further electro-optic mirror unit, said control circuitry further being responsive to the output from said at least one light sensor to establish a drive voltage for said further electro-optic mirror unit.

90. A rearview mirror system as claimed in claim 60, also including at least one further mirror housing mounted on the exterior of the vehicle and containing a further electro-optic mirror unit, said control circuitry further being responsive to the output from said at least one light sensor to establish a drive voltage for said further electro-optic mirror unit.

91. A rearview mirror system as claimed in claim 61, also including at least one further mirror housing mounted on the exterior of the vehicle and containing a further electro-optic mirror unit, said control circuitry further being responsive to the output from said at least one light sensor to establish a drive voltage for said further electro-optic mirror unit.

92. A rearview mirror system as claimed in claim 62, also including at least one further mirror housing mounted on the exterior of the vehicle and containing a further electro-optic mirror unit, said control circuitry further being responsive to the output from said at least one light sensor to establish a drive voltage for said further electro-optic mirror unit.

93. A rearview mirror system as claimed in claim 63, also including at least one further mirror housing mounted on the exterior of the vehicle and containing a further electro-optic mirror unit, said control circuitry further being responsive to the output from said at least one light sensor to establish a drive voltage for said further electro-optic mirror unit.

94. A rearview mirror system as claimed in claim 64, also including at least one further mirror housing mounted on the exterior of the vehicle and containing a further electro-optic mirror unit, said control circuitry further being responsive to the output from said at least one light sensor to establish a drive voltage for said further electro-optic mirror unit.

95. A rearview mirror system as claimed in claim 1, wherein said interior electro-optic mirror unit comprises an electrochromic mirror unit.

96. A rearview mirror system as claimed in claim 2, wherein said interior electro-optic mirror unit comprises an electrochromic mirror unit.

97. A rearview mirror system as claimed in claim 3, wherein said interior electro-optic mirror unit comprises an electrochromic mirror unit.

98. A rearview mirror system as claimed in claim 4, wherein said interior electro-optic mirror unit comprises an electrochromic mirror unit.

99. A rearview mirror system as claimed in claim 5, wherein said interior electro-optic mirror unit comprises an electrochromic mirror unit.

100. A rearview mirror system as claimed in claim 8, wherein said interior electro-optic mirror unit comprises an electrochromic mirror unit.

101. A rearview mirror system as claimed in claim 9, wherein said interior electro-optic mirror unit and said further electro-optic mirror unit comprise electrochromic mirror units.

102. A rearview mirror system as claimed in claim 10, wherein said interior electro-optic mirror unit comprises an electrochromic mirror unit.

103. A rearview mirror system as claimed in claim 11, wherein said interior electro-optic mirror unit comprises an electrochromic mirror unit.

104. A rearview mirror system as claimed in claim 12, wherein said interior electro-optic mirror unit comprises an electrochromic mirror unit.

105. A rearview mirror system as claimed in claim 13, wherein said interior electro-optic mirror unit comprises an electrochromic mirror unit.

\* \* \* \* \*

UNITED STATES PATENT AND TRADEMARK OFFICE
CERTIFICATE OF CORRECTION

PATENT NO. : 6,099,131
DATED : August 8, 2000
INVENTOR(S) : Sean J. Fletcher, Patrick J. Lawlor and Kenneth Schofield It is certified that error appears in the above-identified patent and that said Letters Patent is hereby corrected as shown below:

Abstract, last line:
 "," should be --.--
Column 2, line 1:
 "sensor" should be --sensing-- in the second occurrence
Column 2, line 8:
 "he" should be --be--
Column 2, line 12:
 "the-vehicle" should be --the vehicle--
Column 2, line 22:
 "irfa-red" should be --infra-red--
Column 2, line 55:
 "so" should be --of--
Column 3, line 10:
 "PCE" should be --PCB--

UNITED STATES PATENT AND TRADEMARK OFFICE
CERTIFICATE OF CORRECTION

PATENT NO. : 6,099,131
DATED : August 8, 2000
INVENTOR(S) : Sean J. Fletcher, Patrick J. Lawlor and Kenneth Schofield It is certified that error appears in the above-identified patent and that said Letters Patent is hereby corrected as shown below:

Column 3, line 18:
    "outnut" should be --output--
Column 3, line 15:
    "applies" should be --applied--
Column 3, line 62:
    "PC3" should be --PCB--
Column 4, line 4:
    After "at" delete ","
Claim 9, column 4, line 65:
    "electrooptic" should be --electro-optic--

Signed and Sealed this

First Day of May, 2001

Attest:

NICHOLAS P. GODICI

Attesting Officer    Acting Director of the United States Patent and Trademark Office